United States Patent

Ogawa

[11] Patent Number: 5,803,219
[45] Date of Patent: Sep. 8, 1998

[54] COOLING MECHANISM OF ELECTROMAGNETIC POWDER CLUTCH

[75] Inventor: Hiroshi Ogawa, Fuchu, Japan

[73] Assignee: Fuji Jukogyo Kabushiki Kaisha, Tokyo, Japan

[21] Appl. No.: 731,662

[22] Filed: Oct. 17, 1996

[30] Foreign Application Priority Data

Oct. 30, 1995 [JP] Japan ................................. 7-305122

[51] Int. Cl.⁶ .......................... F16D 13/72; F16D 37/02
[52] U.S. Cl. .................................. 192/21.5; 192/113.31
[58] Field of Search ........................... 192/113.31, 21.5; 188/264 D, 264 CC

[56] References Cited

U.S. PATENT DOCUMENTS

| | | | |
|---|---|---|---|
| 2,526,525 | 10/1950 | Young | 188/264 D |
| 2,791,308 | 5/1957 | Barrett et al. | 192/21.5 X |
| 2,894,155 | 7/1959 | Labastie | 188/264 D X |
| 4,515,257 | 5/1985 | Takano et al. | 192/21.5 X |
| 4,724,942 | 2/1988 | Casse et al. | 188/264 D X |
| 4,871,049 | 10/1989 | Okita | 192/113.31 X |
| 5,003,829 | 4/1991 | DeConti et al. | 188/264 D X |

FOREIGN PATENT DOCUMENTS

| | | |
|---|---|---|
| 52-30442 | 7/1977 | Japan . |
| 53-52849 | 5/1978 | Japan . |
| 55-29747 | 2/1980 | Japan . |
| 982403 | 2/1965 | United Kingdom .............. 192/113.31 |

Primary Examiner—Rodney H. Bonck
Attorney, Agent, or Firm—Martin A. Farber

[57] ABSTRACT

A cooling mechanism of an electromagnetic powder clutch comprises a drive member connected with an output shaft of an engine, a driven member connected with a main drive shaft through a pump drive shaft, a metal powder interposed in the gap between the drive member and the driven member for transmitting torque from the drive member to the driven member, a cooling fluid for cooling said electromagnetic clutch, a cooling passage provided in the driven member for letting flow the cooling fluid therein so as to cool the driven member, an oil supply passage provided in the driven member for supplying the cooling fluid to the cooling passage, an oil drain passage provided in the driven member for draining the cooling fluid from the cooling passage, a supply passage provided in a clearance between the main drive shaft and the pump drive shaft for supplying the cooling fluid to the oil supply passage, and a return passage provided in a center hole of the main drive shaft for returning the cooling fluid from the oil drain passage to a transmission.

13 Claims, 6 Drawing Sheets

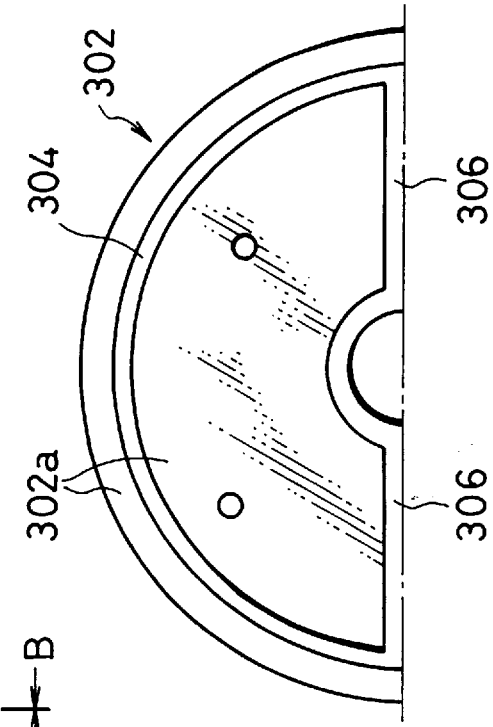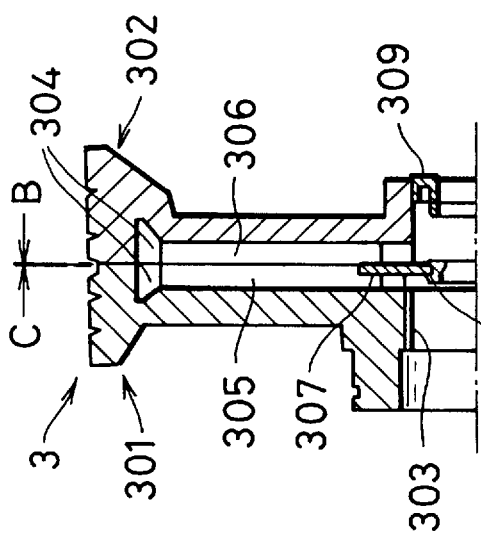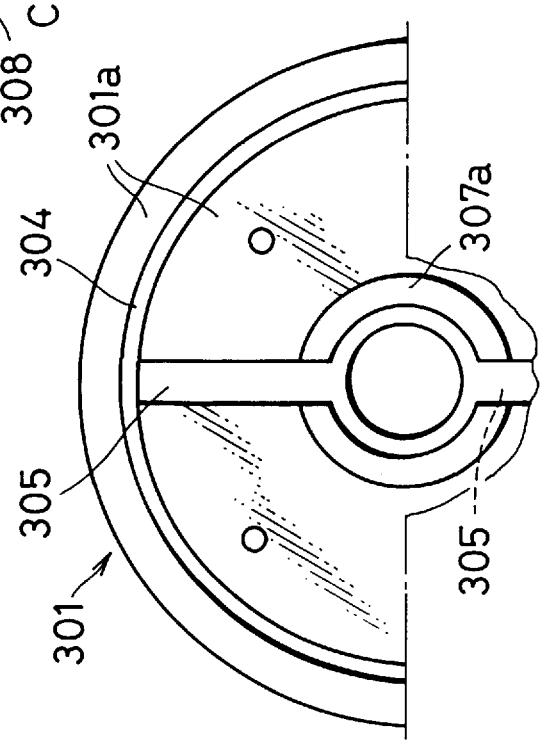

COOLING MECHANISM OF ELECTROMAGNETIC POWDER CLUTCH

BACKGROUND OF THE INVENTION

1. Field of the Invention

The present invention relates to a cooling mechanism of an electromagnetic powder clutch for a vehicle.

2. Prior Art

The electromagnetic powder clutch generates heat due to slips of metal powders when the vehicle starts and a mechanism for cooling the clutch and surrounding components is required. An example of this mechanism, Japanese Unexamined Utility Model Application Jitsu-Kai-Sho No. 55-29747 discloses a technique in which the drive member having fins radiates heat to atmosphere by the rotation of itself.

Further, Japanese Unexamined Patent Application Toku-Kai-Sho No. 53-52849 and Japanese Utility Model Application Jitsu-Ko-Sho No. 52-30442 disclose mechanisms for cooling the clutch by use of cooling fluid circulating inside of the driven member forcedly.

These mechanisms are constituted so as to let cooling fluid in and out from an end surface of the driven member. Therefore, in case of using the electromagnetic powder clutch for the braking purpose, it is easy to let it in and out because the driven member is in standstill. However, in case of using the electromagnetic powder clutch for the clutch purpose it is very difficult to let the cooling fluid in and out because both the drive member and the driven member are rotated.

Particularly, in case of using the electromagnetic powder clutch for the purpose of the vehicle power transmission device, it is desirable that the clutch body can be easily detached together with the cooling circuit from the transmission body for the maintenance or replacement purpose. Considering the constitution wherein cooling fluid is circulated forcedly through the clutch mechanism, it is difficult for the above prior arts to satisfy this requirement. Hence, in practice almost all cooling methods of the electromagnetic powder clutch for vehicle are relied on the air cooling scheme but not the fluid cooling one, although the air cooling method still has a problem that a small cooling effect due to Low specific heat of air and confinement of heat inside due to the closed construction of the driven member make it difficult to emit heat outside of the driven member sufficiently.

SUMMARY OF THE INVENTION

Accordingly, the present invention is intended to obviate the disadvantages of the prior arts and it is an object of the present invention to provide a cooling mechanism of the electromagnetic powder clutch capable of using fluid having a Larger specific heat than that of air as a cooling medium.

It is another object of the present invention to provide a cooling mechanism in which cooling is available while the clutch is being rotated.

Further, it is another object of the present invention to provide a cooling mechanism having a good serviceability, especially when the clutch body is removed from or installed on the transmission.

The cooling mechanism of the electromagnetic powder clutch according to the present invention comprises:

a cooling passage provided in a driven member for letting flow said cooling fluid therein so as to cool the driven member;

an oil supply passage provided in the driven member for supplying cooling fluid to the cooling passage;

an oil drain passage provided in the driven member for draining cooling fluid from the cooling passage;

a supply passage formed between the inner periphery of a center hole of a main drive shaft and the outer periphery of a pump drive shaft for supplying cooling fluid therethrough to the oil supply passage; and a return passage formed in the center of the pump drive shaft for returning cooling fluid therethrough from the oil drain passage to a transmission.

BRIEF DESCRIPTION OF DRAWINGS

FIG. 2a is a sectional view showing a driven member of a first embodiment according to the present invention;

FIG. 2b is a sectional view taken along a line B—B of FIG. 2a;

FIG. 2c is a sectional view taken along a line C—C of FIG. 2a;

DETAILED DESCRIPTION OF THE PREFERRED EMBODIMENTS

Figure 1:
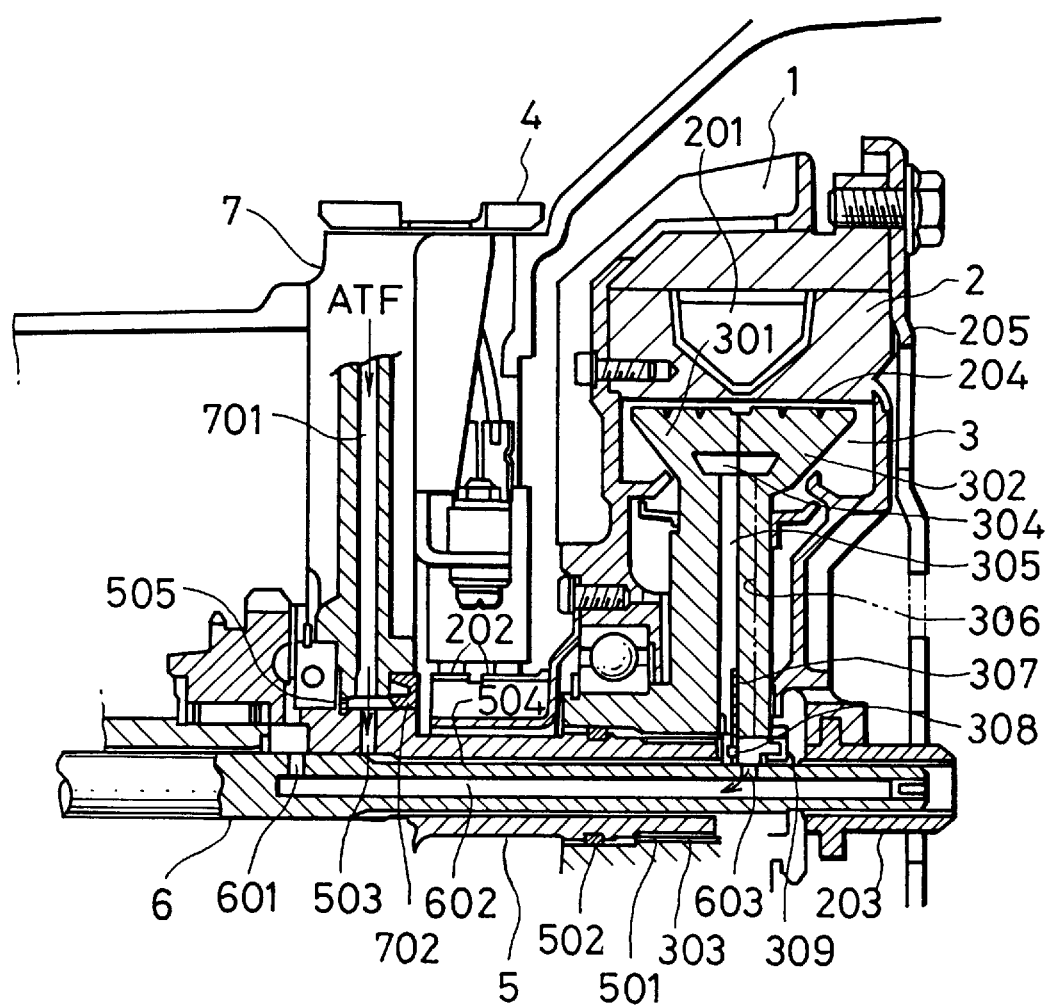
FIG. 1 is a sectional view showing a first embodiment of an electromagnetic powder clutch according to the present invention.

Referring now to FIG. 1, numeral 1 denotes an electromagnetic powder clutch composed of a drive member 2 and a driven member 3. The driven member 3 is coupled with a main drive shaft 5 through a mesh of splines 303, 501. Engine torque is transmitted to the drive member 2 through a drive plate 205 and further to the driven member 3 by friction force of electromagnetic powders. A coil 201 provided in the drive member 2 generates electromagnetic force by a current supplied from a brush 4 through a slip ring 202 so as to control torque transmitted from the drive member 2 to the driven member 3. The current supplied to the brush 4 is controlled by a control unit (not shown). The drive member 2 has a boss 203 with which a pump drive shaft 6 is connected through a spline fitting. The pump drive shaft 6 drives at the same speed as the engine speed an oil pump (not shown) which is disposed at the rear end portion of the transmission in this embodiment. Thus constituted clutch has the same construction as the electromagnetic powder clutch generally used for the input system of the known vehicular continuously variable transmission.

Next, a cooling system of the electromagnetic powder clutch 1 will be described. In this embodiment, an automatic transmission oil (ATF) is used for cooling medium.

The pump drive shaft 6 is rotatably fitted in a center hole of the main drive shaft 5 and a cylindrical clearance 504 is formed between the outer periphery surface of the pump drive shaft 6 and the inner periphery surface of the center hole of the main drive shaft 5. The ATF passes through an oil gallery 701 provided in a housing 7 and a supply hole 503 formed in the main drive shaft 5 and flows into the clearance 504. The clearance between the housing 7 and the main drive shaft 5 is sealed by oil seals 505 and 702 so as to prevent leakage of ATF therethrough.

In the driven member 3, there are provided with a ring-shaped cooling passage 304, an oil supply passage 305 and an oil drain passage 306 both of which are extended radially from the center of the main drive shaft 5 toward the cooling passage 304. The oil supply passage 305 communicates the clearance 504 with the cooling passage 304 to supply oil and the oil drain passage 306 communicates the cooling passage 304 with a return passage 602 provided in a center hole of the pump drive shaft 6 through a communicating hole 603 to drain oil. The return passage 602 is communicated with the inner side of the transmission through a drain hole 601. Thus, the ATF enters into the oil gallery 701 provided in the transmission body, passes through the supply hole 503, enters into the clearance 504, passes through the oil supply passage 305 and flows into the ring-shaped cooling passage 304. After the ATF collects heat of the driven member 3, it flows through the oil drain passage 306 and the communicating hole 603, enter into the return passage 602, and is discharged into the transmission through the drain hole 601. Oil seals 502 and 309 are provided between the driven member 3 and the main drive shaft 5 and between the driven member 3 and the pump drive shaft 6 respectively to prevent leakage of ATF inside of the clutch.

More detailed construction of the cooling passage in the driven member 3 will be described with reference to FIGS. 2a, 2b and 2c.

Figure 3:
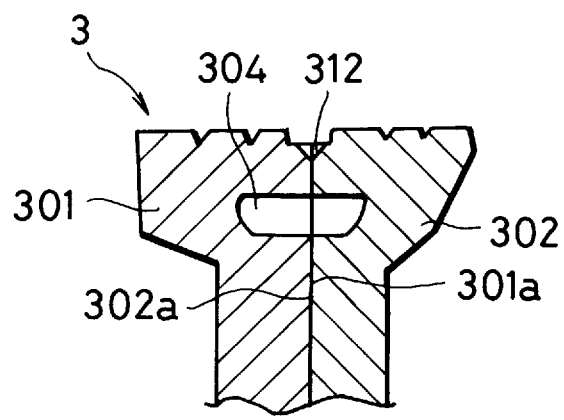
FIG. 3 is a partially sectional view showing an example of a sealing structure of a connecting portion of a driven member.
Figure 4:
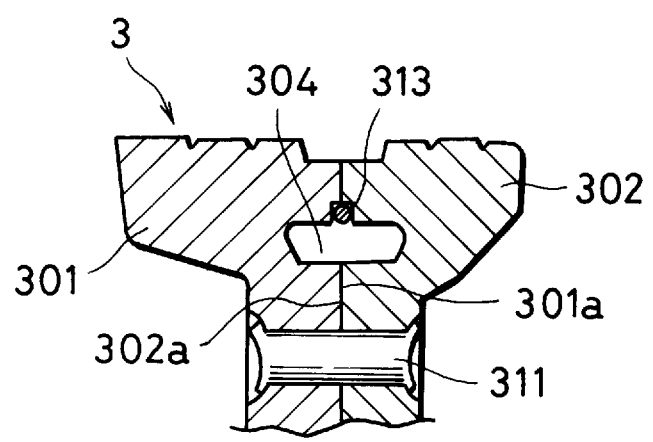
FIG. 4 is a partially sectional view showing another example of a sealing structure of a connecting portion of a driven member.

The driven member 3 is divided into two parts, 301 and 302 along a parting face perpendicular to the rotational center axis thereof. The ring-shaped cooling passage 304, the oil supply passage 305 and the oil drain passage 306 are grooved on parting faces 301a and 302a of the parts 301 and 302 respectively. As shown in FIG. 3 and FIG. 4, these parting faces 301a and 302a are connected with each other with a weld 312 or rivet 311, respectively, forming a driven member having a cooling passage inside thereof. The oil supply passage 305 has a specified angular phase (in this embodiment 90 degrees of angular phase) in the rotational direction with respect to the oil drain passage 306. A ring-shaped disk 307 is fit in a seat 307a formed on the central part of the parting face 301a of the driven member 3 so as to separate the oil supply passage 305 from the oil drain passage 306. A seal member 308 is bonded to the inner flange of the disk 307 by way of baking and other methods. The seal member 308 is elastically contacted with the outer periphery surface of the pump drive shaft 6. Instead of connecting 301 with 302 by means of a rivet, as in FIG. 4, the weld 312 may be applied over the outer periphery of the driven member 3 as shown in FIG. 3. An O ring 313 may be inserted between 301 and 302 as shown in FIG. 4 for preventing the oil from leaking from the parting faces 301a, 302a.

Figure 5:
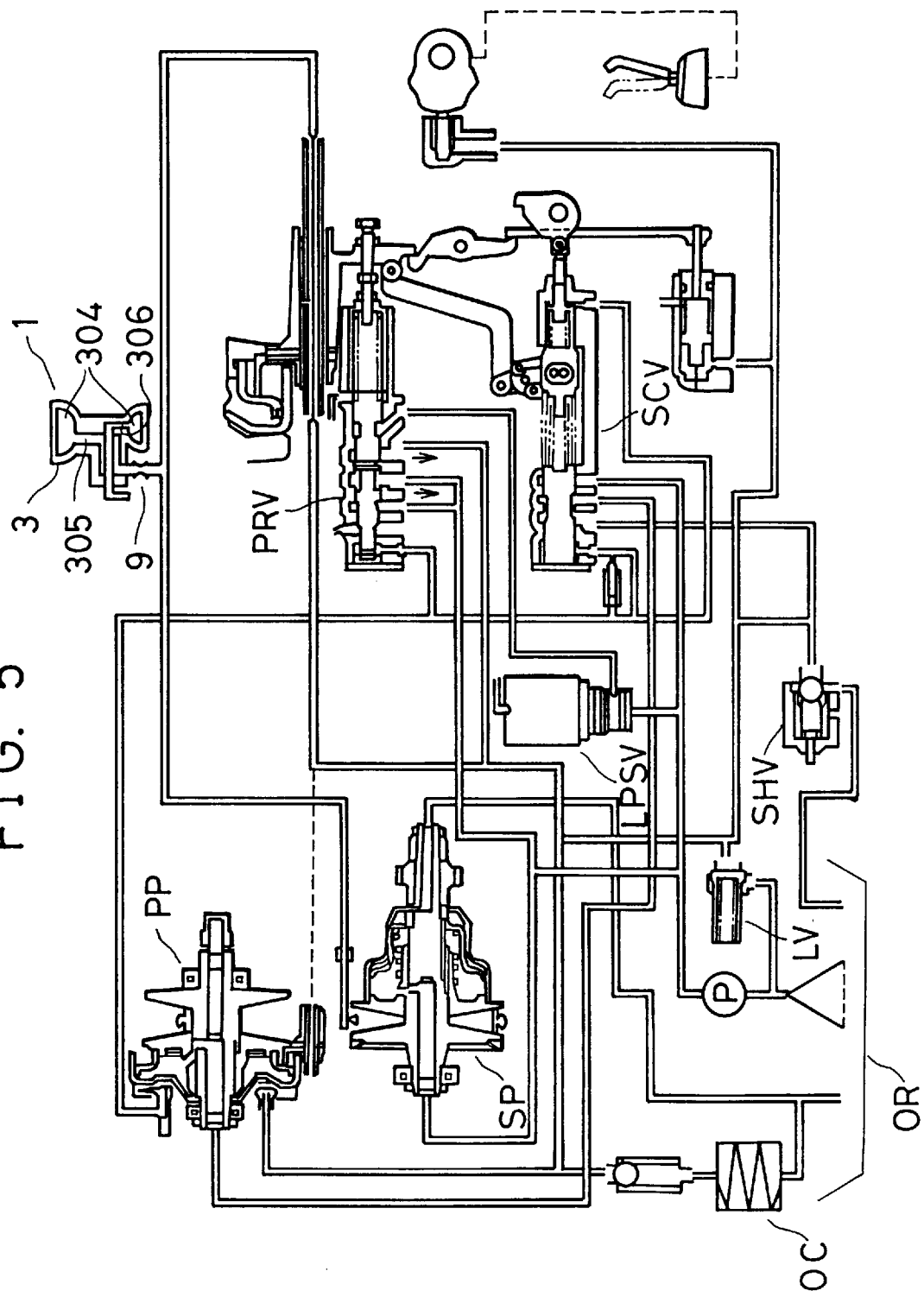
FIG. 5 is a circuit diagram of an example of a hydraulic control system of a vehicular continuously variable transmission to which an electromagnetic powder clutch according to the present invention is applied.

Referring to FIG. 5, this is a circuit diagram of the hydraulic system according to the first embodiment. Discharge pressure of a hydraulic pump P is converted by a pressure regulating valve PRV into line pressure for operating a primary pulley PP and a secondary pulley SP. The drain oil of the pressure regulating valve PRV is used for lubricating transmission parts and also used for cooling the driven member 3. That is, a part of the drain oil is guided through an orifice 9 to the cooling circuit for cooling the driven member 3. In the drawing, numeral SCV denotes a shift control valve, numeral SHV does a shift hold valve, numeral LPSV does a solenoid valve for line pressure, numeral LV does a lubrication valve, numeral OC does an oil cooler and numeral OR does an oil reservoir.

The hydraulic circuit shown in FIG. 5 has basically the same construction as the known control system used for the continuously variable transmission excepting a portion of the cooling circuit and therefore more detailed descriptions thereof will be omitted hereinafter.

According to the first embodiment of the present invention, since the supply and return passages of cooling fluid (in this embodiment, cooling oil) are formed concentrically with respect to the rotating axis, cooling fluid can be circulated in the cooling circuit regardless of whether the driven member is rotated or not. Further, because of the same reason, the assembly of the electromagnetic powder clutch can be easily removed or installed as it is and just inserting the assembly of the electromagnetic powder clutch into the transmission shaft forms the cooling circuit. Further, dividing the driven member into two pieces 301 and 302 makes it easy to provide the cooling passages 304, 305 and 306. For example, it is possible to form grooves by cold forging, this enabling to reduce manufacturing cost. Further, since the drive member 2 which is always rotated by the engine is continued to be cooled by the surrounding air and the driven member 3 which is almost fully enclosed is continued to be cooled by cooling fluid (ATF) always circulating inside thereof, the whole body of the powder clutch is efficiently cooled.

In this embodiment, the clearance 504 is used for supplying cooling fluid and the return passage 602 is used for returning cooling fluid, however as another variation of the embodiment, the clearance 504 may be used for returning cooling fluid and the return passage 602 may be employed for supplying cooling fluid.

Figure 6:
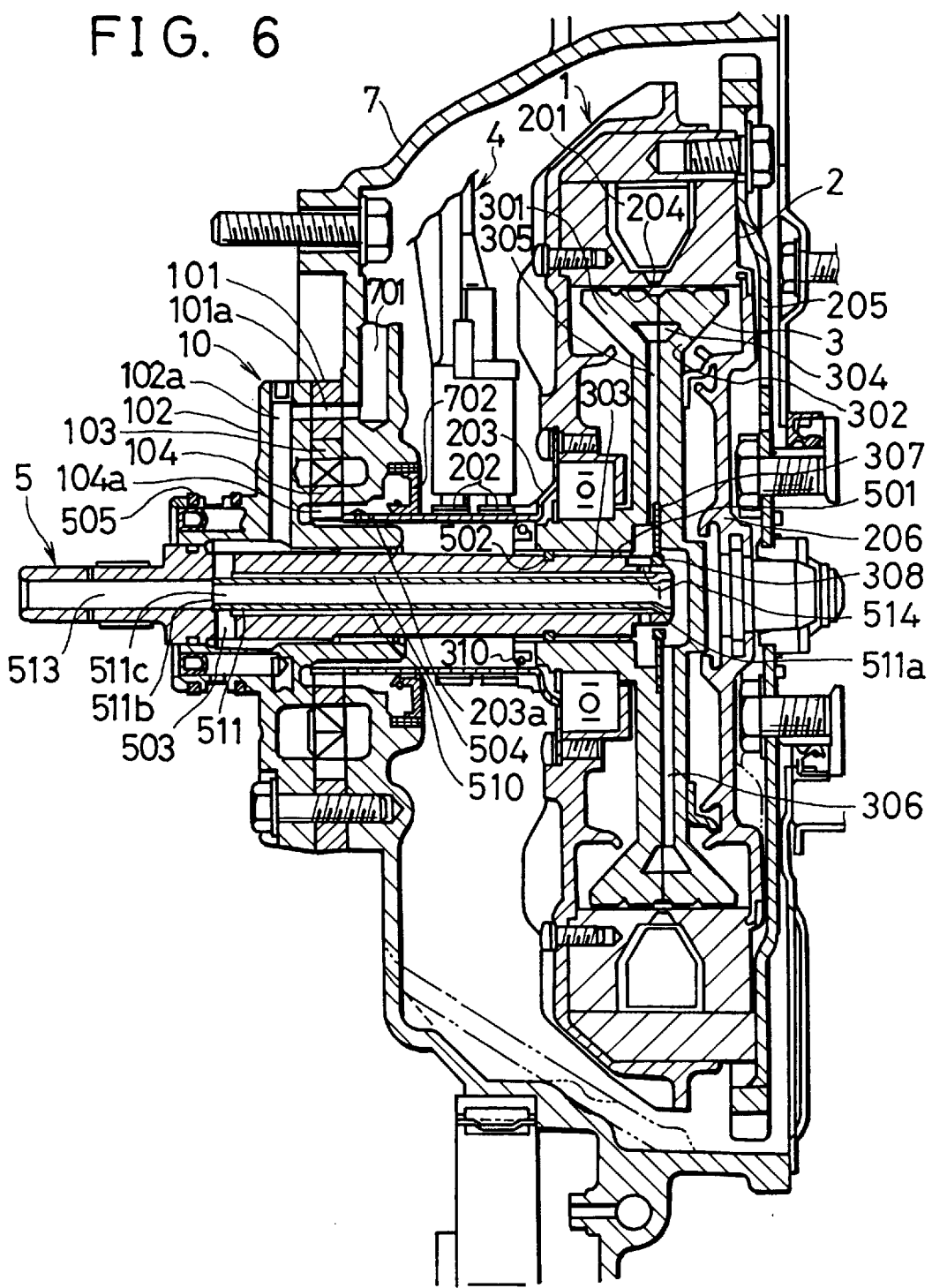
FIG. 6 is a sectional view showing a second embodiment of an electromagnetic powder clutch according to the present invention.
Figure 7B:
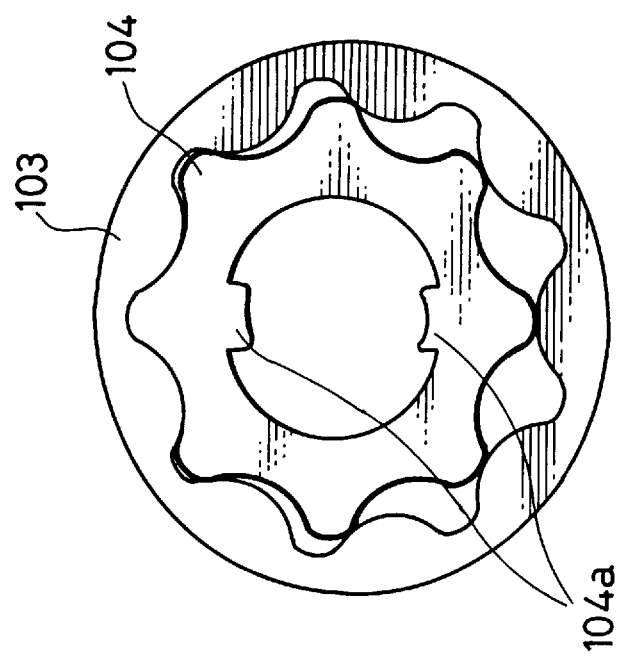
FIG. 7b is an explanatory view showing a mesh state of a gear set of a hydraulic pump according to a second embodiment.
Figure 7A:
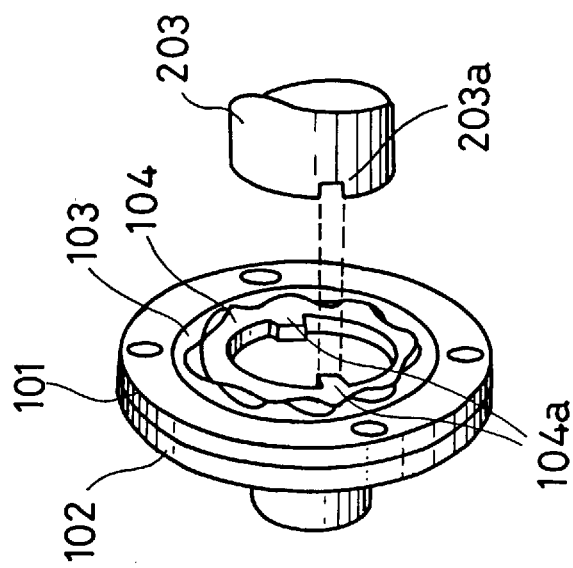
FIG. 7a is a perspective view showing a construction of a hydraulic pump used in an electromagnetic powder clutch according to a second embodiment.

FIG. 6 depicts a second embodiment of the present invention, in which a hydraulic pump 10 is disposed adjacent to the front wall of the clutch housing 7. As shown in FIG. 7, the hydraulic pump 10 is an internal gearing type gear pump comprising a pump housing 101, a pump cover 102, a set of gears 103, 104 accommodated in the space formed by the pump housing 101 and the pump cover 102. An internal gear 104 of the gear pump 10 has a protruding portion 104a projected inside and a boss 203 extended from the drive member 2 has a notch portion 203a. The protruding portion 104a is inserted into the notch portion 203a so as to drive the hydraulic pump. Thus, the pump 10 is driven directly by the engine.

As shown in FIG. 6, cooling oil goes from a lubrication oil circuit 701 provided in the wall of the clutch housing 7 to an oil passage 503 provided in the main drive shaft 5 through an oil passage 101a provided in the pump housing 101 and an oil passage 102a provided in the pump cover 102. A pipe 511 is fitted in the center hole of the main drive shaft 5 in order to form two different oil passages concentrically. The pipe 511 has an open end 511a at the fitting portion in a large hole 510 of the main drive shaft 5 and has another open end 511b at the fitting portion in a small hole 513 of the main drive shaft 5. Thus, an annulus clearance 504 is formed between the outer periphery surface of the pipe 511 and the inner periphery surface of the center hole of the main drive shaft 5 and a return passage 511c is formed between both open ends 511a and 511b. Cooling oil enters the annulus clearance 504 from the oil passage 503 and flows into the ring-shaped cooling passage 304 of the driven member 3 through the oil passage 514 and the oil supply passage 305. Cooling oil receives heat while it circulates in the ring-shaped cooling passage 304. After that, it enters the oil drain passage 306 and flows into the center hole of the main drive shaft 5 through the open end 511a. Finally, cooing oil passes through the return passage 511c and is discharged into the transmission from the small hole 513 of the main drive shaft 5. With respect to the leaked oil from the pump, an oil seal 702 prevents the leaked oil from leaking outside and further an oil seal 310 prevents the leaked oil from invading inside of the clutch.

According to the second embodiment of the present invention, similarly to the first embodiment, since the supply and return passages of cooling oil are provided concentrically in the main drive shaft, cooling oil can be circulated in the cooling circuit regardless of whether the driven member is rotated or not. Further, similarly to the first embodiment, because of the same reason, the assembly of the electromagnetic powder clutch can be easily removed or installed as it is and just inserting the assembly of the electromagnetic powder clutch into the transmission shaft forms the cooling circuit. Further, dividing the driven member into two pieces 301 and 302 makes it easy to provide the cooling passages 304, 305 and 306. For example, similarly to the first embodiment, it is possible to form grooves by cold forging, this enabling to reduce manufacturing cost.

Further, according to the second embodiment, the existence of the oil seal 310 eliminates a fear of oil coming into the clutch due to the breakage of the seal 502 when the electromagnetic powder clutch is inserted into the main drive shaft 5. Further, the existence of the oil seal 310 has an advantage of preventing spilled oil from coming into the clutch when the electromagnetic powder clutch 1 is removed from the transmission.

In this embodiment, the annulus clearance 504 is used for supplying cooling fluid and the return passage 511c is used for returning cooling fluid, however as another variation of the embodiment, the clearance 504 may be used for returning cooling fluid and the return passage 511c may be employed for supplying cooling fluid.

In summary, according to the present invention, since the supply and return passages of cooling fluid are provided concentrically in the main drive shaft, cooling fluid can be circulated in the cooling circuit regardless of whether the driven member is rotated or not. Further, the assembly of the electromagnetic powder clutch can be easily removed or installed as it is and just inserting the assembly of the electromagnetic powder clutch into the transmission shaft forms the cooling circuit.

Further, dividing the driven member into two pieces along a parting section orthogonal with respect to the rotating center axis of the driven member makes it easy to provide the cooling passages. As a result of this construction, it is possible to form grooves by cold forging, this enabling to reduce manufacturing cost.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A cooling mechanism of an electromagnetic powder clutch having a hydraulic pump, a drive member rotated by an engine, a driven member connected with a main drive shaft of a transmission, a pump drive shaft rotatably coupled with said main drive shaft and rotated by said engine for driving said hydraulic pump, a metal powder interposed between said drive member and said driven member for transmitting torque from said drive member to said driven member and a cooling fluid for cooling said electromagnetic powder clutch, comprising:

a cooling passage provided in said driven member for letting flow said cooling fluid therein so as to cool said driven member;

an oil supply passage provided in said driven member for supplying said cooling fluid to said cooling passage;

an oil drain passage provided in said driven member for draining said cooling fluid from said cooling passage;

a supply passage formed between the inner periphery of a center hole of said main drive shaft and the outer periphery of said pump drive shaft for supplying said cooling fluid therethrough to said oil supply passage; and a return passage formed in the center of said pump drive shaft for returning said cooling fluid therethrough from said oil drain passage to said transmission.

2. The cooling mechanism according to claim 1, wherein said driven member comprises two pieces divided along a parting face orthogonal with respect to the rotating axis and said cooling passage, said oil supply passage and said oil drain passage are formed on either or both of said two pieces.

3. The cooling mechanism according to claim 1, further comprising:

a disk provided between two pieces of said driven member near the center thereof for separating said oil supply passage from said oil drain passage.

4. The cooling mechanism according to claim 1, wherein said cooling passage is a ring-shaped space formed in said driven member.

5. A cooling mechanism of an electromagnetic powder clutch having a drive member rotated by an engine, a driven member connected with a main drive shaft of a transmission, metal powder interposed between said drive member and said driven member for transmitting torque from said drive member to said driven member and a cooling fluid for cooling said electromagnetic powder clutch, comprising:

a cooling passage provided in said driven member for letting flow said cooling fluid therein so as to cool said driven member;

an oil supply passage provided in said driven member for supplying said cooling fluid to said cooling passage;

an oil drain passage provided in said driven member for draining said cooling fluid from said cooling passage;

a pipe provided in a center hole of said main drive shaft;

a supply passage formed between the outer periphery of said pipe and the inner periphery of said center hole of said main drive shaft for supplying said cooling fluid therethrough to said oil supply passage;

a return passage provided in an inner diameter of said pipe for returning said cooling fluid therethrough from said oil drain passage to said transmissions; and said driven member comprises two half pieces divided along a center parting face extending radially from adjacent said main drive shaft orthogonally with respect to an axis of rotation of the driven member, and said cooling passage, said oil supply passage and said oil drain passage are formed on at least one of said two pieces at said parting face.

6. The cooling mechanism according to claim 5, further comprising:

an oil seal provided between a boss of said drive member and a boss of said driven member for preventing said cooling fluid from coming in said electromagnetic powder clutch.

7. The cooling mechanism according to claim 5, wherein said cooling passage is a ring-shaped space formed in said driven member.

8. The cooling mechanism according to claim 5, further comprising a disc disposed between said two pieces of said driven member separating said oil supply passage from said oil drain passage.

9. A cooling mechanism of an electromagnetic powder clutch having a drive member rotated by an engine, driven member connected with a main drive shaft of a transmission, metal powder interposed between said drive member and said driven member for transmitting torque from said drive member to said driven member and a cooling fluid for cooling said electromagnetic powder clutch, comprising:

a cooling passage provided in said driven member for letting flow said cooling fluid therein so as to cool said driven member;

an oil supply passage provided in said driven member for supplying said cooling fluid to said cooling passage;

an oil drain passage provided in said driven member for draining said cooling fluid from said cooling passage;

a pipe provided in a center hole of said main drive shaft;

a supply passage formed between the outer periphery of said pipe and the inner periphery of said center hole of said main drive shaft for supplying said cooling fluid therethrough to said oil supply passage;

a return passage provided in an inner diameter of said pipe for returning said cooling fluid therethrough from said oil drain passage to said transmission; and a disk provided between two pieces of said driven member near the center thereof for separating said oil supply passage from said oil drain passage.

10. A cooling mechanism of an electromagnet powder clutch housed in a casing having, a drive member connected to a power source via a drive plate for receiving torque by rotation thereof, a coil included in said drive member for generating magnetic flux, a driven member coaxially included in said drive member for being driven by said magnetic flux, a main drive shaft coaxially connected to said driven member via splines for being rotated at the same speed of said driven member, metal powder interposed in a gap between said drive member and said driven member for being magnetized by said coil when an electric current is supplied thereto via a slip ring, and a pump drive shaft connected to said drive member and coaxially inserted in said driven member for driving a pump, the cooling mechanism comprising:

a first oil passage formed in said main drive shaft in a radial direction and communicating with a supplying passage formed in said casing;

a cylindrical oil passage formed between said drive shaft and said pump drive shaft and connected to said first oil passage for supplying a cooling fluid from said supplying passage to said driven member for cooling thereof;

a circular cooling fluid passage formed in said driven member for circulating said cooling fluid within an inside periphery of said driven member;

said driven member being formed of a first half disc and a second half disc divided in a radial direction;

a supply passage formed in said first half disc in said radial direction and connected between said circular cooling fluid passage and said cylindrical oil passage;

a return passage formed in said second half disc in said radial direction and connected to said circular cooling fluid passage;

a circular plate with an oil seal interposed between said first and second half discs for separating said supply passage and said return passage;

a drain port formed in said pump drive shaft for communicating with said return passage and for draining said cooling fluid from said circular cooling fluid passage via said return passage; and a drain passage formed in the center of said pump drive shaft for delivering said cooling fluid from said electromagnetic powder clutch to outside so as to effectively cool down said driven member by forcibly circulating said cooling fluid in said electromagnetic powder clutch even when said driven member stops, greatly improving maintenance at low cost with simple configuration.

11. The cooling mechanism according to claim 10, wherein said first and second half discs of said driven member comprise two pieces divided along a parting face orthogonally with respect to an axis of rotation of said driven member, and said cooling fluid passage, said supply passage and said return passage are formed on at least one of said two pieces.

12. The cooling mechanism according to claim 10, wherein said cooling fluid passage is a ring-shaped space formed in said driven member.

13. A cooling mechanism of an electromagnet powder clutch housed in a casing having, a drive member operatively connected to a power source for receiving torque, a coil included in said drive member for generating magnetic flux, a driven member coaxially included in said drive member for being driven by said magnetic flux, a main drive shaft coaxially connected to said driven member for being rotated by said driven member, metal powder interposed in a gap between said drive member and said driven member for being magnetized by said coil by an electric current, and a pump drive shaft connected to said drive member and coaxially inserted in said driven member for driving a pump, the cooling mechanism comprising:

a first oil passage formed in said main drive shaft and communicating with a supplying passage formed in said casing;

a cylindrical oil passage formed between said drive shaft and said pump drive shaft and connected to said first oil passage for supplying a cooling fluid from said supplying passage to said driven member for cooling thereof;

a circular cooling fluid passage formed in said driven member for circulating said cooling fluid within an inside periphery of said driven member;

said driven member being formed of a first half disc and a second half disc divided in a radial direction;

a supply passage formed in said first half disc in said radial direction and connected between said circular cooling fluid passage and said cylindrical oil passage;

a return passage formed in said second half disc in said radial direction and connected to said circular cooling fluid passage;

a circular plate with an oil seal interposed between said first and second half discs and separating said supply passage and said return passage;

a drain port formed in said pump drive shaft communicating with said return passage and for draining said cooling fluid from said circular cooling fluid passage via said return passage; and a drain passage formed in the center of said pump drive shaft for delivering said cooling fluid from said electromagnetic powder clutch to outside so as to effectively cool said driven member by forcibly circulating said cooling fluid in said electromagnetic powder clutch even when said driven member stops, greatly improving maintenance at low cost with simple configuration.

* * * * *